No. 873,879. PATENTED DEC. 17, 1907.
M. MAURER.
ROLLING MILL SCALE.
APPLICATION FILED MAR. 7, 1906.
4 SHEETS—SHEET 2.
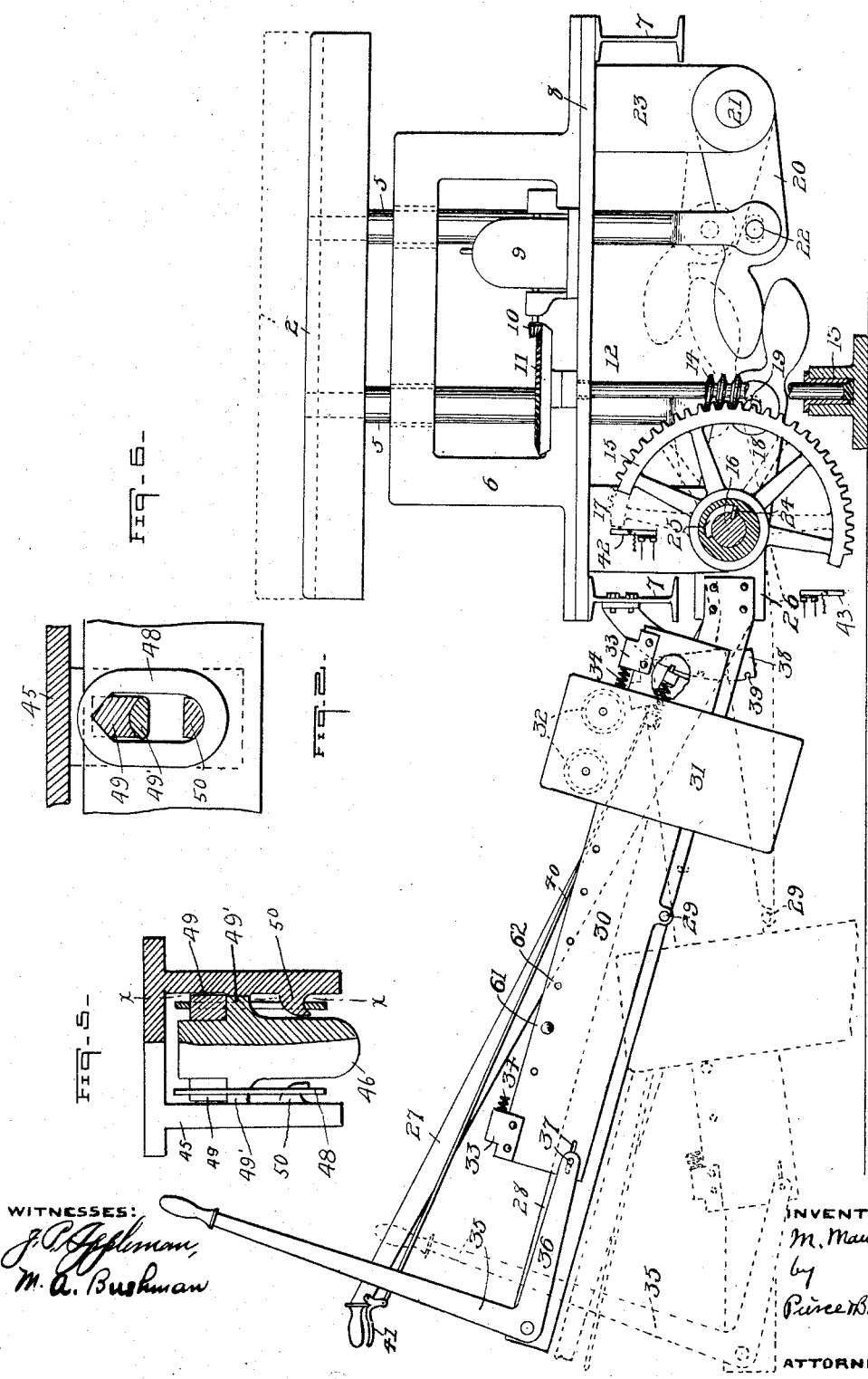
WITNESSES:
INVENTOR
M. Maurer
by
Pierce Barber
ATTORNEYS No. 873,879. PATENTED DEC. 17, 1907.
M. MAURER.
ROLLING MILL SCALE.
APPLICATION FILED MAR. 7, 1906.
4 SHEETS—SHEET 3.
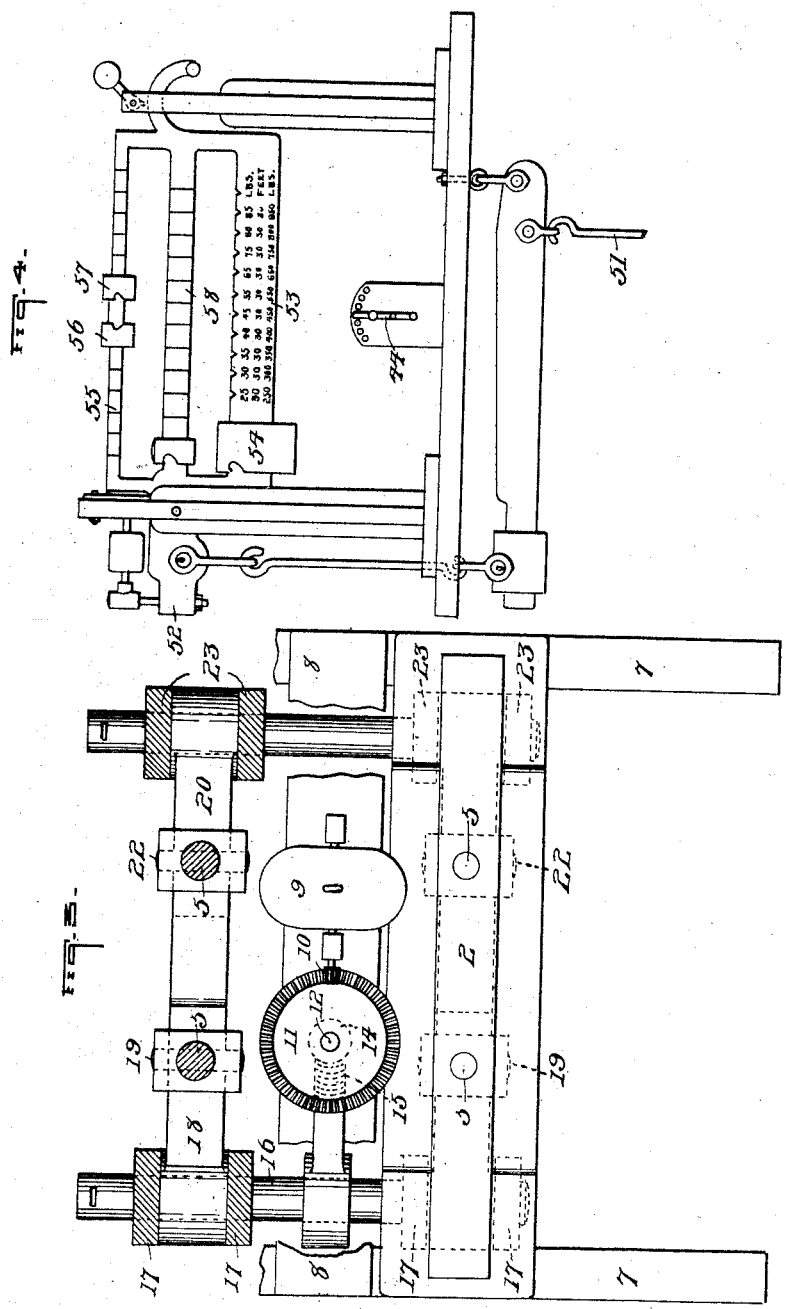

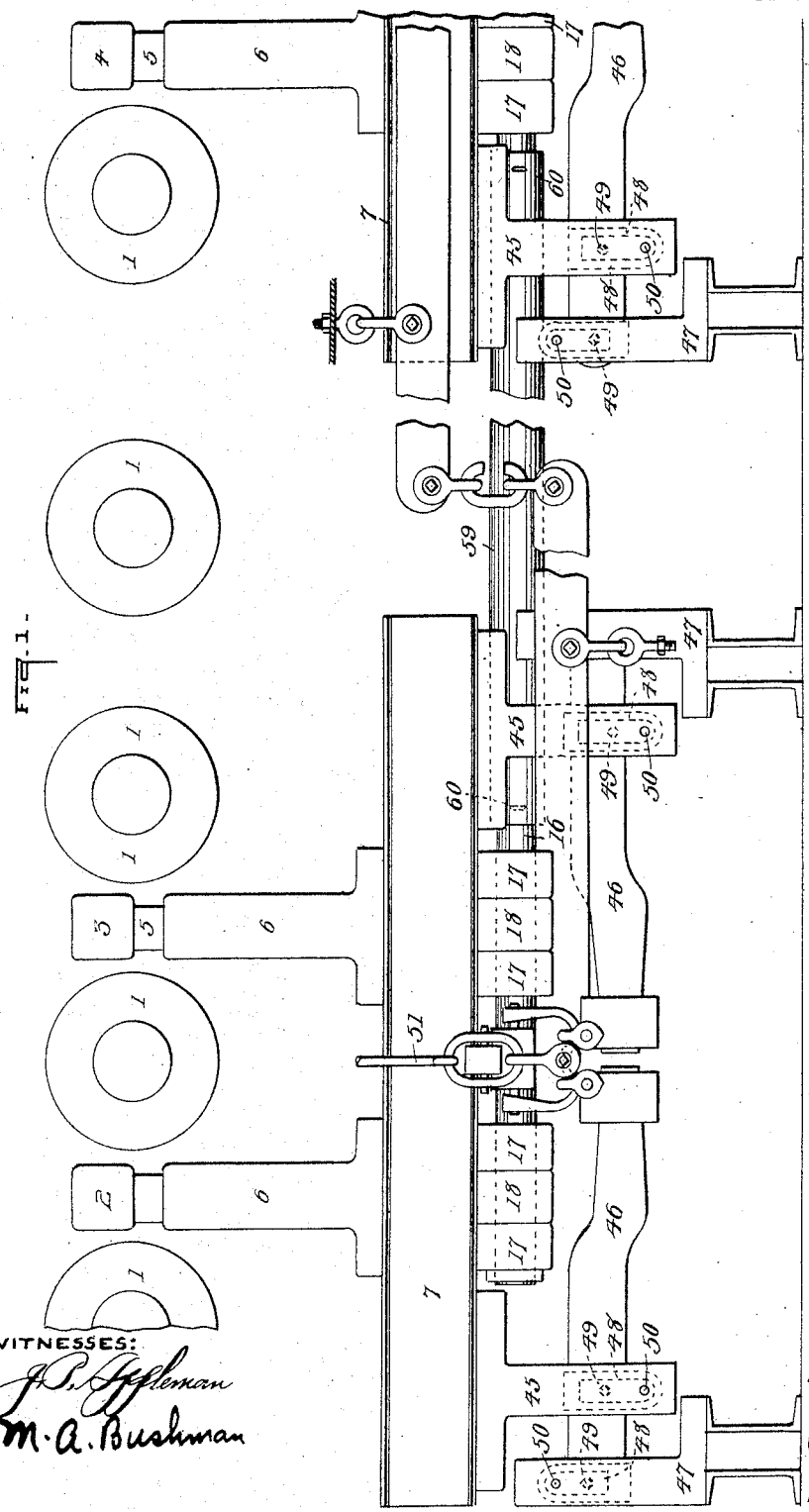

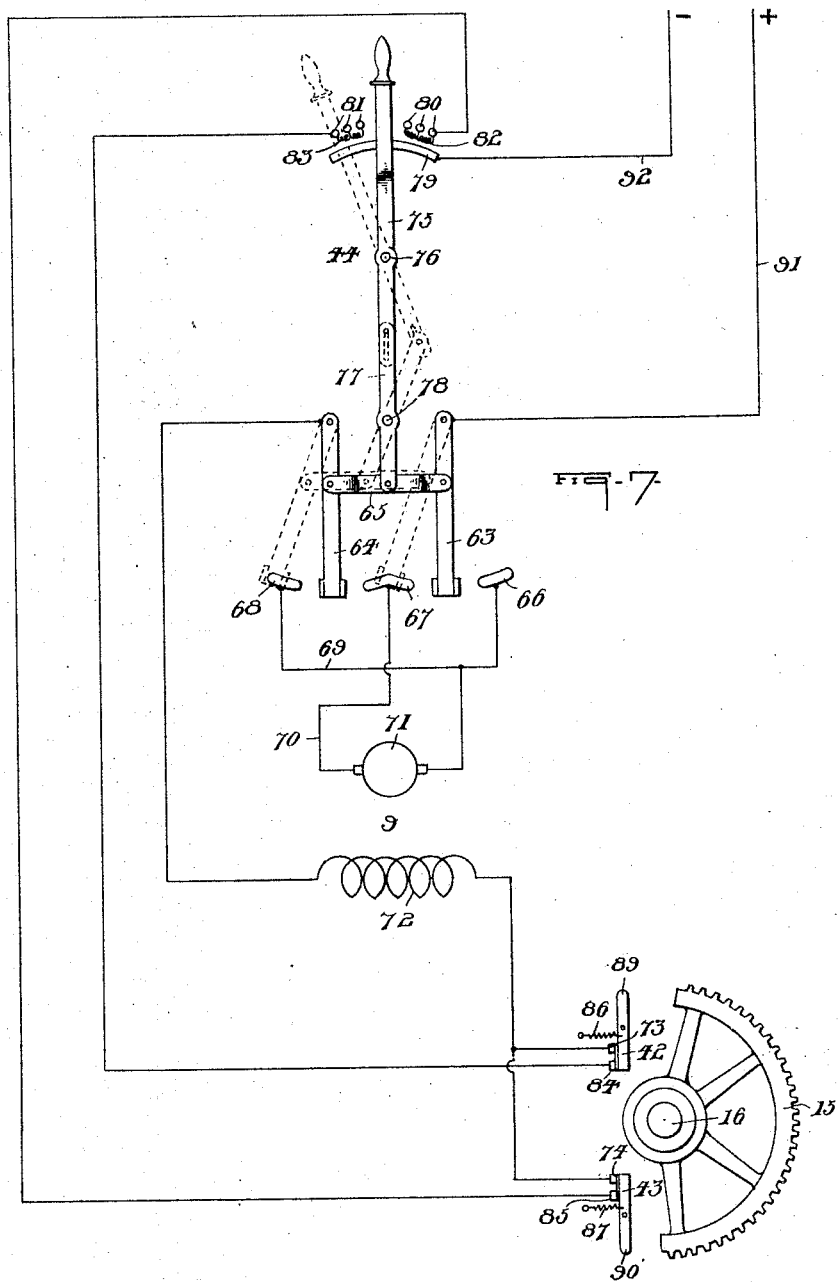

UNITED STATES PATENT OFFICE.

MARTIN MAURER, OF PUEBLO, COLORADO.

ROLLING-MILL SCALE.

No. 873,879.      Specification of Letters Patent.      Patented Dec. 17, 1907.

Application filed May 7, 1906. Serial No. 304,630.

*To all whom it may concern:*

Be it known that I, MARTIN MAURER, a citizen of the United States, residing at Pueblo, in the county of Pueblo and State of Colorado, have invented or discovered new and useful Improvements in Rolling-Mill Scales, of which the following is a specification.

My invention relates to weighing mechanism for use with rolling mills and has particular reference to scales for weighing rolled products, as beams, rails, and the like, as they issue from the rolls for the purpose of determining whether they have the required weight for their length, and how much more or less they weigh than the required amount. My scales are also for use in weighing billets, blooms, and the like.

Referring to the drawings which form a part of this specification, Figure 1 is a side elevation of a part of a rolling-mill table and of a part of two sections of a scale for use in connection therewith, the plunger-operating mechanism being omitted; Fig. 2, an elevation, partly in section, of one of the plungers and the alternative operating mechanisms therefor; Fig. 3, a half plan and horizontal section of a pair of plungers and the operating mechanism therefor; Fig. 4, a side elevation of the scale beam and parts immediately connected therewith and of the motor controller; Fig. 5, a detail partly in section showing the manner of connecting the levers and the stands; Fig. 6, a section on the line x—x of Fig. 5; and Fig. 7, a diagram of the electrical circuits.

On the drawings, 1 designates a number of rollers of a rolling-mill or other table or conveyer, and 2, 3, and 4 the horizontal metal-supporting cross-heads or cross-bars located between the rollers 1 and normally below their upper surfaces. These cross-bars are supported on the upper ends of the rods or plungers 5, guided in the frames 6 resting on the I-beams 7.

Supported on the cross-piece 8, resting on the beams 7 is the electric or other motor 9. The motor-shaft carries the bevel pinion 10, which meshes with the bevel wheel 11, supported on the vertical shaft 12, having bearings in the cross-piece 8 and the foot or step 13. The shaft 12 carries a worm 14 meshing with the segment 15 of a worm-wheel on the horizontal rock-shaft 16 mounted in hangers 17 on the under side of the frames 6. The shaft 16 has fixed thereto the cam-arms 18 secured to the nearest plungers 5 by the pivots 19. The cam shaped ends of the arms 18 lie beneath and actuate the cam-arms 20 which are carried by the shaft 21 and to which the plungers 5 farthest from the shaft 16 are pivotally connected by the pins 22. The shaft 21 is supported in the hangers 23 on the under side of the frames 6.

In Fig. 2, I have shown a hand-operated device for actuating the shaft 16. This device is for use when for any reason the motor becomes inoperative or it is preferred to use a hand device. The shaft 16 carries a pin or piece of metal 24 which has movement in the arc-shaped slot 25 in the hub of the segment 15. Normally the pin is at the right-hand end of its travel, as shown in Fig. 2. The shaft 16 has secured thereto the lug 26, in which is secured the operating lever 27 and the arm 28. To the arm 28 is secured the pin 29 on which rocks the beam 30 carrying the weight 31 having the rollers 32, running on the upper edge of the beam. Each end of the beam carries a weight stop 33, having secured thereto the cushion-spring 34. The outer end of the arm 28 pivotally supports the angle-lever 35, whose short arm 36 has a pin and slot connection 37 with the beam 31. One of the I-beams 7 supports the segment 38, having therein the notches 39 in which the end of the catch rod 40 engages to lock the arm 28 in any desired position. The usual finger pull 41 on the handle 27 withdraws the rod 40 from the notches.

42 and 43 are switches for stopping automatically the motor 9 so that the mechanism will not be broken. These switches are operated by the ends of the segment, one switch stopping the motor when the articles are lifted to a certain level, and the other switch stopping it when the cross-bars are below the article.

The I-beams 7 are supported on the bearing stands 45 which rest on the levers 46, each having one end supported by a stand 47. The levers 46 are not connected directly to the bearing stands 45 and the stands 47, but by the links 48 provided each with the saddle bearing block 49. The lower side of each bearing block is rounded to a proper radius to take up the motion of vibration in weighing. The links and saddle blocks relieve the wear on the pivots 50 which bear on the links. Referring to Fig. 5, it will be seen that the rounded part of the bearing block 49 permits the rocking of the levers without causing a perceptible movement of the pivots 50 on the ends of the links.

The scale levers are, except as described, of the usual construction. Their movement is transmitted to the rod 51, which is shown on Fig. 4 connected to the indicator or weighing beam 52 in the usual manner. On the beam 52 is the bar 53 bearing three horizontal lines of figures, viz.—the upper line indicating the weights per yard of the product to be weighed; the second line the length in feet of such products; and the third the total weight of such products for the length and the weight per yard directly above. Thus, in the first vertical column, 25 means, for example, the weight per yard required for certain beams; the 30 under the 25 shows the required length of the beam; and the 250 under the 25 and 30 indicates the weight of a thirty foot beam, weighing 25 pounds per yard in length.

54 is the poise or weight for the scale bar 53. 55 is the upper bar on the scale beam 52 and carries the two poises 56 and 57 which are normally close together near the center of the bar 55. If a beam, rail, etc. has the required weight per yard, the weights 56 and 57 will not need to be moved; but if the beam or rail is too light per yard, the weight 56 will be moved to the left until the beam 52 balances, whereupon the weight will show the number of pounds the beam or rail is too light. If the beam or rail is too heavy per yard, the weight 57 will be moved to the right and when the beam 52 balances, the weight 57 will indicate how much the overweight is. I prefer to mark the weights 55 and 57 respectively, with the words "Light" and "Heavy" or with the initials "L" and "H", as shown. The middle bar 48 is for ordinary weighing.

On Fig. 1 I have shown how one section of a scale may have another secured thereto in order to weigh long articles. The manner of uniting the scale lever mechanism may be as desired, it already being old to unite together two or more sections to form a single weighing mechanism. The sections are substantially alike and the shafts 16 of adjacent sections are connected together preferably by a sleeve 59 which has telescopic connection with said shafts. The sleeve is connected to the shafts 16 by the pins 60 or in any other desired manner. In case one section breaks down or gets out of order, it may be uncoupled and the other section or sections employed. Ordinarily the number of sections in use will vary with the lengths and weights of the articles weighed, but I do not limit myself to the use of any definite number of sections.

The article to be weighed is delivered from the rolling mill to roller table or other support. The handle of the controller 44 is moved to start the motor in the proper direction to cause the shaft 16 to lift the arms 18 which as they rise, lift the arms 20. The arms 18 and 20 lift the plungers 5 and the cross-bars 2, which move from the full-line to the dotted-line position on Fig. 2 and at the same time lift the article from the rollers and cause the weight thereof to be borne by the scale levers. The weight 54 is moved on the bar 52 so as to indicate the required weight per yard of the article. The required weight for the length indicated by the middle line of the bar will be shown on the lower line. The weight 56 and 57 is moved to ascertain how much too light or heavy the article is. The motor is stopped during the weighing by one of the switches 42 or 43 or by the controller 44; and after the weighing, by the other switch or the controller.

The rollers 1 are merely symbolic of any table whether a traveling conveyer or a stationary table.

The hand mechanism of Fig. 2 is hung on the shaft 16 so as to balance the cross-bars. The article being above the cross-bars 2, the handle 27 is lowered until the arm 28 is horizontal. During this movement the pin 24 will rock in the slot 25. The handle 35 is now thrown to the right, which rocks the scale beam 30 on its pivot 29 and causes the weight 31 to run to the left until it engages the stop 61 placed in one of the holes 62 in the beam. The rolling of the weight to the left will overbalance the load and raise it clear of the rollers, conveyer or platform, on which it was resting. The article is then weighed the same as when the motor was employed to lift the article. By reversing the operations of the levers 35 and 27, all the parts are returned to their normal positions, as shown on Fig. 2, and the article on the cross-bars 2 is again lowered upon the conveyer or platform.

Referring to Fig. 7, 63 and 64 are a pair of switch arms connected together by the link 65 and constituting the reversing-switch element of my controller. The arms are arranged when the motor circuit is open at the main switch $b$ to stand as shown in full lines, the arm 63 standing midway between the fixed contacts 66 and 67, and the arm 64, midway between the said contact 67 and the fixed contact 68. The contacts 66 and 68 are connected together by the wire 69, connected to the middle contact 67 by the wire 70, which has the armature 71 of the motor 9 in its circuit. The field 72 of the motor has one terminal connected to the switch arm 64 and the other terminal connected to the fixed contacts 73 and 74 of the limit switches 42 and 43. The handle 75 of the controller 44 is movable on the pivot 76 between its ends, its lower end having a pin-and-slot connection with one end of the lever 77 movable on the pivot 78 between its ends. The remaining end of the lever 77 is pivotally connected to the link 65 at its middle portion which is insulated from its end portion. The upper end of the controller handle is insulated from the remainder thereof and serves as a switch member and has uninterrupted contact with the long fixed contact 79. To the right and left of the handle 75 when in its vertical position are the contacts 80 and 81, connected in parallel with their respective rheostats 82 and 83, the outer member of the contacts 81 being connected to the fixed contact 84 of the switch 42, and the outer member of the contacts 80 being connected to the fixed contact 85 of the switch 43. Normally the switch 42 is held against the contacts 73 and 84 by the spring 86, and the switch 43, against the contacts 74 and 85 by the spring 87. The switches 42 and 43 have the respective extensions 88 and 89 standing in the path of movement of the ends of the segment 15. The positive lead wire 91 is connected to the switch arm 63, and the negative wire 92, to the contact 79.

When the parts stand as in Fig. 7, the motor connections are severed at both the reversing and the rheostatic switches, and the motor 9 will be at rest. If the handle is moved to the left, so that it and the reversing switches stand as shown in the dotted lines, the circuits are as follows: from the positive wire 91 through the switch arm 63, the contact 67, the wire 70 and the armature 71, the contact 68, the switch arm 64, the field 72, the contact 73, the switch 42, the contact 84, one of the contacts 81, the upper end of the lever 75, and the contact 79 to the negative wire 92. This will cause the armature 71 to rotate and the latter will have, when the weight has been lifted as before described, caused the rotation of the segment 15 so that it will engage the extension 89 of the switch 42 and move the latter away from its contacts 73 and 84, thus opening the motor circuit. The contacts of the switch 43 are dead, because the contacts 80 and 79 are not connected. When the weighing has been completed the lever 75 is swung over to the contacts 80 and the arms 63 and 64 over to the contacts 66 and 67, respectively, whereupon the motor circuit will be closed as follows: from the positive wire 91 through the switch arm 63, the contact 66, the wire and the armature 71 in a direction opposite to the former direction, and thence through the contact 67, the switch arm 64, the field 72, the contact 74, the switch 43, the contact 85, one of the contacts 80, the upper end of the lever 75, and the contact 79 to the negative wire 92. As the current through the armature 71 is reversed, the motor will rotate in the reverse direction and by the time the load has been deposited on the rollers 1 or soon thereafter the segment engages the extension 90 and shoves the switch 43 away from the contacts 74 and 85, thus opening again the motor circuit. The contacts of the switch 43 were closed by the spring 86 as soon as the segment 15 permitted the same, but these contacts remain dead during the lowering of the cross-bars 3, as the lever 75 does not bridge the contacts 81 and 79. When the lever 75 is swung again to its dotted position, the motor will be again reversed and the cross-bars caused to rise as before.

I do not desire to be restricted to the precise mechanism shown and described as it can be variously modified and still retain the spirit of my invention.

Having described my invention, I claim—

1. An article support, a weighing mechanism having means for lifting the article above its said support, an electric motor for operating said lifting means and means for automatically stopping the motor when the article has been lifted from said support.

2. An article support, a weighing mechanism having means for lifting the article above its said support, a motor for operating said lifting means and means for automatically stopping the motor when the article has been lifted from said support and means for stopping the motor when the article has been deposited upon said support.

3. An article support, a weighing mechanism having means for lifting the article above its said support, a shaft for operating said lifting means, a worm gearing on said shaft for operating the same, a motor for operating the worm gearing, a hand-operated device for operating said shaft, independent of the worm gearing and means permitting the shaft to be operated by the said hand-operated device without operation of the worm gearing.

4. An article support, a weighing mechanism having means for lifting the article above its said support, a shaft for operating said lifting means, a worm gearing on said shaft for operating said shaft, means independent of the worm gearing for operating said shaft and a lost motion connection between last named means and said worm gearing.

5. An article support, a weighing mechanism having means for lifting the article above its said support, and alternative motor and hand devices for actuating said lifting means and means preventing the operation of the motor device during the operation of the hand-operated device.

6. An article support, a weighing mechanism means supported by said mechanism for lifting the article above its support, an overbalance beam for said lifting means and article, a weight movable along said beam, and means for causing the weight to move along said beam so as to over-balance and lift the load above said support.

7. An article support, a series of weighing mechanisms, each having means for lifting the article above its support, means for operating one of said lifting means, and means for detachably connecting one or more of the members of said series to said operating means.

Signed at Pueblo, Colorado, this 3rd day of August A. D. 1905.

MARTIN MAURER.

Witnesses:
J. C. DURFEE,
J. H. ROBINSON.